Patented July 12, 1932

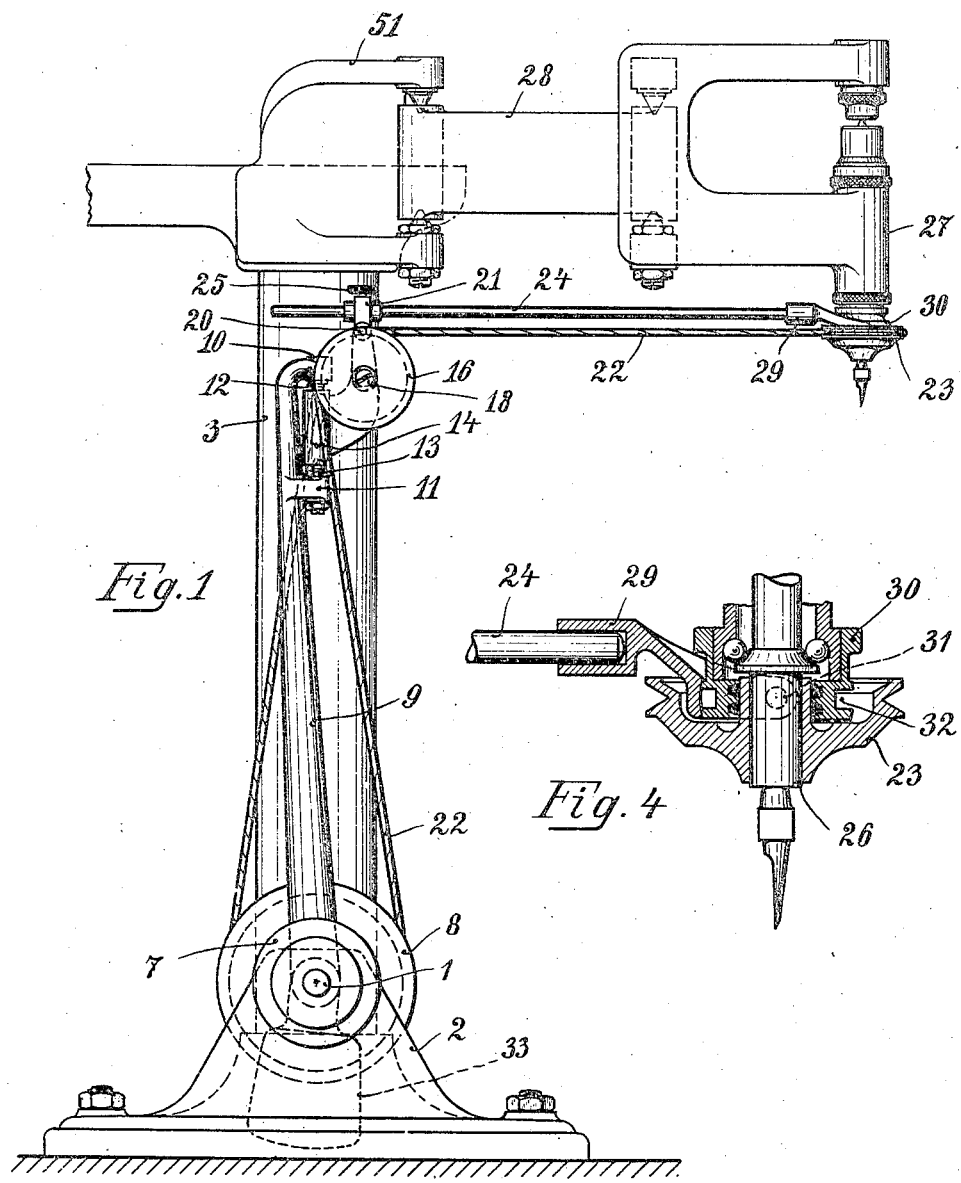

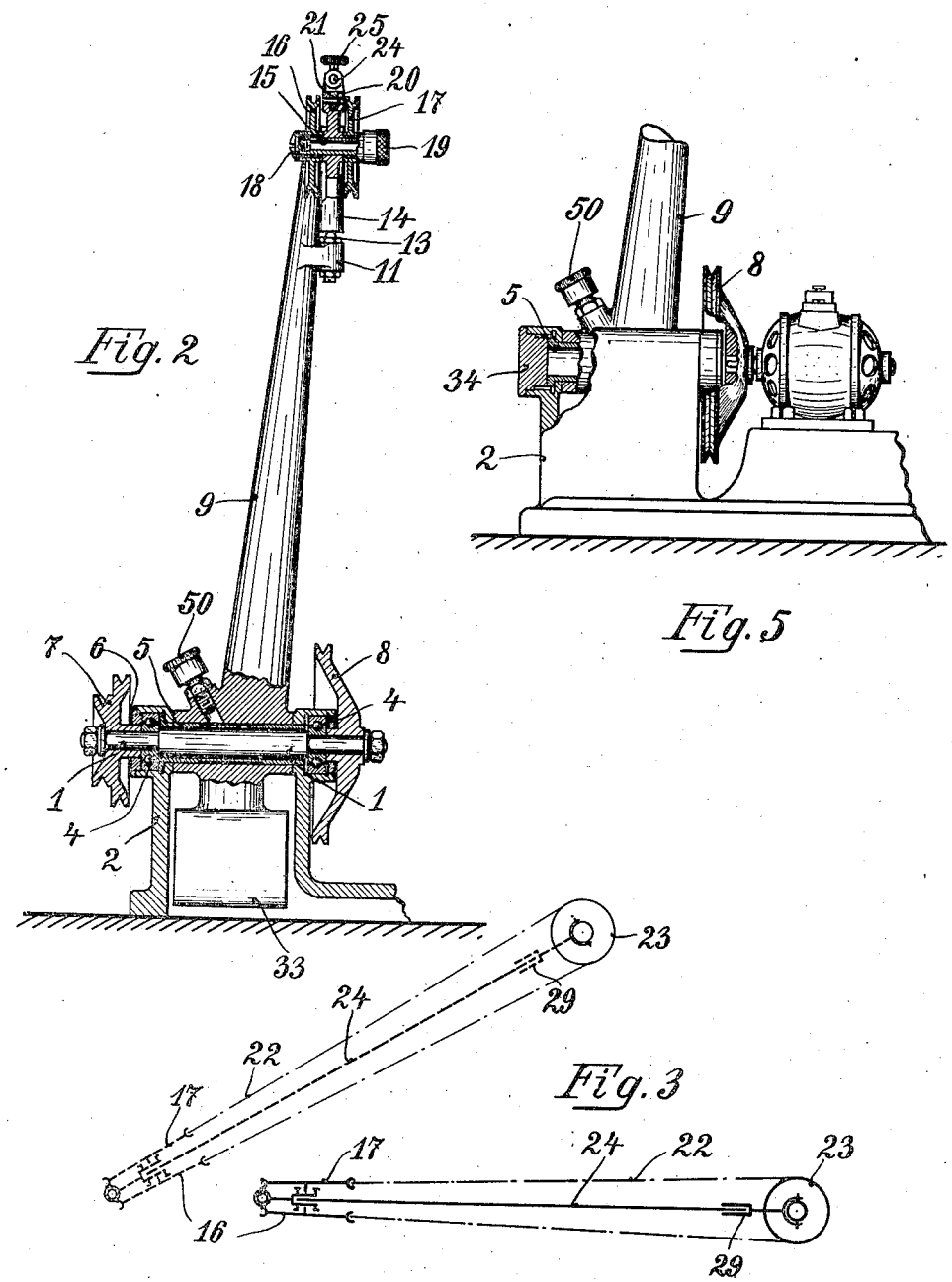

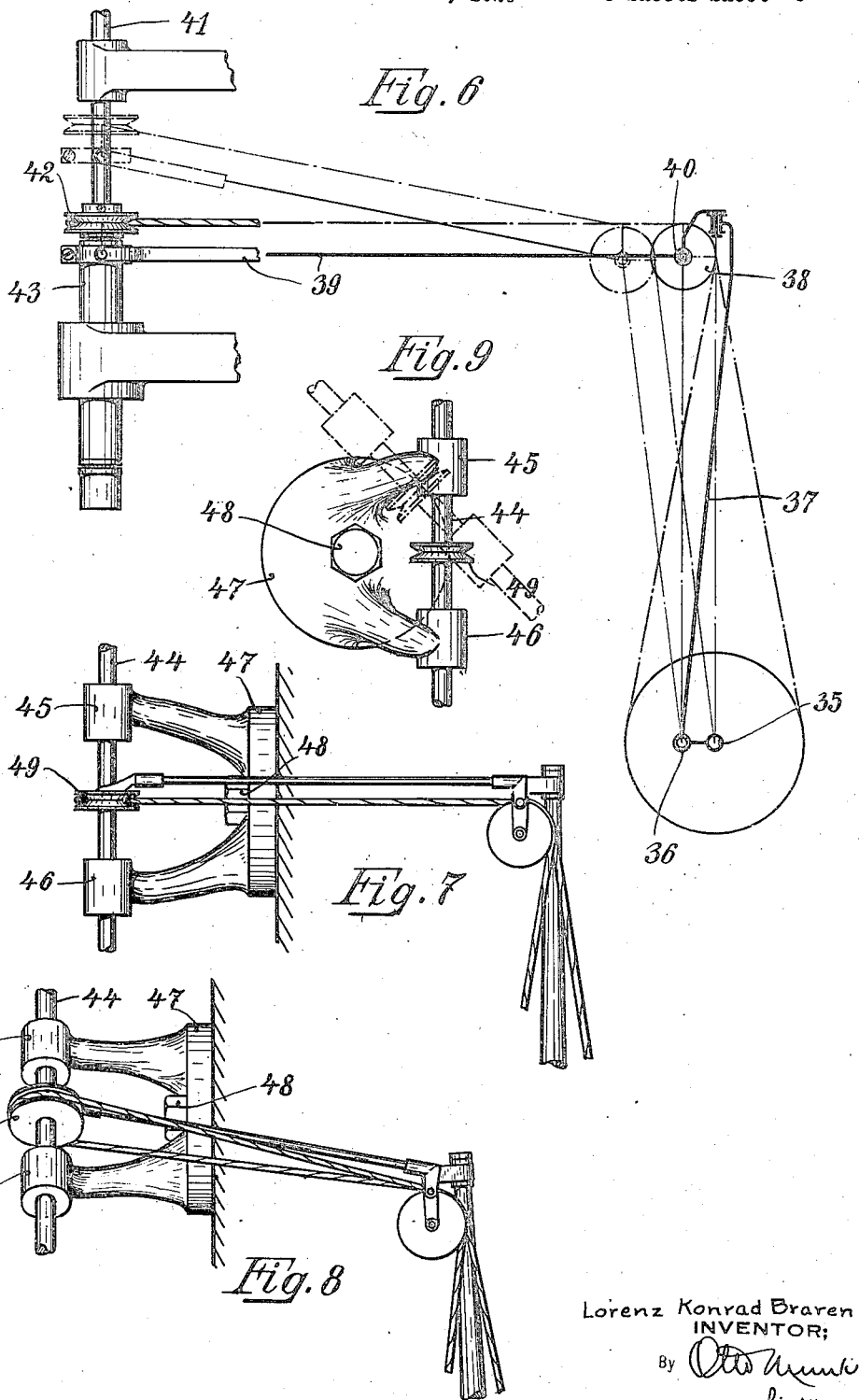

1,867,490

UNITED STATES PATENT OFFICE

LORENZ KONRAD BRAREN, OF MUNICH, GERMANY, ASSIGNOR TO THE FIRM FRIEDRICH DECKEL, FABRIK FÜR PRÄZISIONSMECHANIK UND MASCHINENBAU, OF MUNICH, BAVARIA, GERMANY

BELT GEARING

Application filed December 4, 1923, Serial No. 678,486, and in Germany December 11, 1922.

The object of this invention is to provide an improved simple and efficient means for transmitting power with a single driving means from a stationary shaft to a movable shaft without changing the total length of the driving means for the various positions the movable shaft may assume. Without any variation in the total length of the driving means, of course, there cannot be exerted belt pull on the driven spindle. The driven shaft may be movable in one, two or all three directions. The angular relation of the driven to the driving shaft may also be varied to suit the requirements of the particular application.

A further object of the invention is to provide means for taking up slack in case of stretch occurring in the driving means, thus permitting the use of belts that have been fabricated in endless form without variation in thickness.

Fig. 1 is a side view of the belt gearing applied for illustrative purposes to an engraving machine.

Fig. 2 is an end view according to Fig. 1 looking from the right.

Fig. 3 is a top view showing the gearing diagrammatically in two different positions.

Fig. 4 shows in detail the connection of the drive to the driven spindle.

Fig. 5 is identical to the lower portion of Fig. 2 but shows the arrangement when driven by a motor.

Fig. 6 shows the application of the belt gear in slightly different form to a spindle performing only axial movements.

Figs. 7, 8 and 9 show the application of the belt gear for driving a spindle that may be adjusted to various angular positions.

A stationary shaft 1 is turnably mounted on ball bearings 4 in a suitable bracket 2, which may be either an integral part of the machine frame 3 or a separate piece. A bushing 5 is held by a screw cap 6 and one of the ball bearings 4 concentric to the stationary shaft 1 but with sufficient space left between the two for lubricant to enter. A pulley 7 is fastened to one end of the shaft 1 and a driving pulley 8 to the other end.

The pulley 7 is driven by a belt from a motor or countershaft, which drive has not been shown. An arm 9 is turnably mounted on the bushing 5, a grease cup 50 being provided for lubricating these bearing surfaces and the ball bearings 4 through holes provided in the bushing 5. One end of the arm 9 is formed as a counterweight 33 and on the other end there are two projecting lugs 10 and 11 in which two pintle screws 12 and 13 are located. These pintle screws are adjustable to allow a bracket 14 to turn freely yet without play. A shaft 15 is fastened in the head or bracket 14 providing on a substantially vertical axis on each side of the bracket a bearing for two idler pulleys 16 and 17 respectively, a screw 18 on the one end and a shoulder of the shaft 15 on the other end of the shaft preventing axial movement. A grease cup 19 screwed over the shoulder of the shaft presses lubricant through a hole in the center of the shaft 15 to the bearing surfaces. An arm of the bracket 14 protrudes upwards carrying a pin 20 on which a holder 21 may rock. The center line of pin 20 and the axis formed by the holes for the pintle screws 12 and 13 are located at such distances from the shaft 15 that the belt 22 passing from the driving pulley 8 over the idler pulleys 16 and 17 to the driven pulley 23 runs on or off the idler pulleys substantially in the planes of these lines. In other words, the axis of the pintle screws 12 and 13 is substantially tangent to the cylindrical surface defined by the peripheries of the guide pulleys 16 and 17, while the axis of the pivot pin 20 lies substantially in or is an element of such cylindrical surface. A connecting rod 24 is held adjustably in the rocking holder 21 by a screw 25. In this way the drive may be readily tensioned for varying lengths of the driving means, facilitating thus the use of endless friction belt transmission.

The pulley 23 is fastened to a driven shaft 26. In Figure 1 the belt gear is shown applied to an engraving machine, where the driven shaft 26 or cutting tool spindle is mounted in a housing or cutter head 27, free to move axially. A link 28 is turnably connected on one end to a bracket 51 of the frame 3 and on the other end to the housing 27, thus allowing the end of the housing 27 which forms the bearing for the shaft 26 to move in a plane at right angles to the axial movement of the shaft 26, under control of means such as the usual or any suitable pantograph mechanism indicated by the link 28, for moving said housing or head laterally over the work. The belt pull is transmitted by the connecting rod 24 to a fork 29 and from this part to a bushing 30 that moves axially with the shaft 26 but does not turn with it. Pins 31 fastened in the arms of the fork 29 slide in a groove 32 of the bushing 30. The faces of the bushing 30 and of the fork 29 in contact with each other are ball shaped with a radius swung from the center of the shaft 26, where it pierces the plane of the belt groove of the pulley 23. The connecting rod rests loosely in a corresponding hole of the fork 29. In this way it is possible for the shaft 26 to assume any position, also angular in relation to the fixed shaft 1 without changing the length of the driving means 22 as may readily be understood from the above description and the drawings Figs. 1 and 3.

The use of an electric motor simplifies the arrangement of the drive, as is shown in Fig. 5. In this case the driving pulley 8 is mounted on the motor shaft coaxially with the bushing 5, which is held in place by a slightly different screw cap 34.

In the type of engraving machine described in Figures 1 to 5, the invention thus provides an endless friction belt transmission for driving the cutter spindle pulley, with supporting means for said transmission constructed and arranged to maintain said transmission under uniform tension embodying the counter-balanced upright vertically swingable lever 9 having a lateral push and pull connection 24 between the laterally movable cutter head and the horizontal oscillatory cross head 14, which latter is supported independently of the pantograph mechanism and head 27 in a position spaced from and to one side of the cutter head. The belt transmission may thus be maintained under uniform tension by the universally movable mechanical connection 24 between the cutter head and the counter shaft support 14, the counter shaft support being oscillated and operating to swing the upright lever 29 as the cutter head is moved over the work.

In Fig. 6 a similar belt drive is shown applied to a spindle moving only axially. Here the axis of the driving shaft 35 and the axis 36 on which the arm 37 turns are not arranged coaxially but a distance equal to the radius of the idler pulley 38 apart. The connecting rod 39 joins the shaft 40 of the idler pulley at a sleeve 43 on the driven shaft 41 which is located below the driven pulley 42 a distance also equal to the radius of the idler 38. Thus two parallelograms are formed that insure always a constant belt length as may be seen by the dotted lines indicating a different position.

In the Figures 7, 8 and 9 the application of the belt gear is shown to a spindle assuming various angular positions. The drive itself is identical to the one shown in Fig. 1. The driven shaft 44 is journaled in two bearings 45 and 46 which form part of a bracket 47. The latter is turnably located on a pivot stud 48, so that the driving pulley 49 assumes different positions as may be seen most readily in Fig. 9.

Having now fully explained my invention I do not wish to be understood as limiting myself to the exact details of construction nor to the particular applications shown, as obviously many modifications will occur to a person skilled in the art.

What I claim is:

1. In an engraving machine and the like, in combination, a cutter head provided with a rotary cutting tool spindle having a driven pulley for driving said spindle, mechanism for moving said head laterally over the work, an endless friction belt transmission for driving said pulley, and supporting means for said transmission constructed and arranged to maintain said transmission under uniform tension, said supporting means embodying a counter balanced upright vertically swingable lever having lateral push and pull connection with said cutter head including a head carried by said lever and rotatable on a vertical axis and carrying pulleys for said transmission.

2. An engraving machine and the like, comprising a cutter head movable laterally over the work and carrying a rotary cutter spindle, a belt transmission for driving such spindle and means for constantly maintaining said transmission under approximately uniform driving tension with respect to said spindle whatever the operative lateral position of the head over the work, said means embodying a fulcrumed counterbalanced member carrying transmission belt pulleys, said member being supported independently of said head and being connected therewith to constantly maintain the relative positions of the head and member during the lateral movements of the head over the work.

3. An engraving machine and the like, comprising a cutter head carrying a rotary cutter spindle, means to move the head laterally over the work, a belt transmission for driving said spindle, and means for maintaining said transmission under approximately uniform driving tension with respect to said spindle, during the operative lateral movements of the head over the work, said means embodying a vertically swingable member provided with a horizontally oscillatory cross head carrying pulleys and operatively connected with said cutter head to constantly maintain relative positions of the cutter head and cross head during the operative lateral movements of the cutter head over the work.

4. In an engraving machine and the like, a cutter head movable in various directions laterally over the work and provided with a rotary spindle adapted to receive a cutter to operate on the work, said spindle having a driving pulley, in combination with an endless friction belt, transmission drive for said pulley, pulleys for said drive and supports for said pulleys embodying a pivotally mounted elongated arm at its free end spaced laterally from and swingable toward and from said head and operatively connected therewith by means other than the spindle driving belt to maintain approximately uniform tension of said belt on said spindle pulley during the lateral movements of the head over the work.

5. An engraving machine, comprising a cutter head having a rotary cutter spindle and its driving pulley, means for shifting said head horizontally over the work, and a driving transmission for said pulley embodying a main drive pulley, an endless friction belt drive from said drive pulley to said spindle driving pulley and supporting and guide means for said friction belt drive comprising an upright lever vertically swingable from a transverse supporting axis at its lower end, a support carried by the free end of said lever and relatively oscillatory on a vertical axis and provided with belt pulleys and a mechanical connection between said cutter head and said counter shaft support to oscillate said support and swing said lever as the cutter head is moved over the work to maintain said drive belt under uniform tension.

6. In a machine drive, a horizontal driving shaft provided with a pulley, an arm pivoted on said driving shaft to swing in a vertical plane, means for counterbalancing said arm, a member pivoted on said arm about an axis lying substantially in a plane containing said driving shaft, pulleys on said member, a driven shaft provided with a pulley, a bearing supporting said driven shaft in substantially vertical position for movement horizontally over the work, a second arm connecting said member and bearing to maintain a constant distance therebetween, and belt means passing over said pulleys on said member and shafts.

7. In a machine drive, a horizontal driving shaft provided with a pulley, an arm pivoted on said driving shaft to swing in a vertical plane, means for counterbalancing said arm, a member pivoted on said arm about an axis substantially perpendicular to said driving shaft, pulleys on said member, a driven shaft provided with a pulley, a bearing supporting said driven shaft in substantially vertical position for movement horizontally over the work, a second arm pivoted on said member about a substantially horizontal axis and connected with said bearing, said second arm having means for adjusting the length thereof and operating to maintain a constant spacing between said member and bearing, and belt means passing over said pulleys on said member and shafts.

8. In a machine drive, a driving shaft provided with a pulley, an arm pivoted on said driving shaft to swing in a substantially vertical plane, means for counterbalancing said arm, a member provided with guide pulleys and pivoted on said arm about an axis extending longitudinally of said arm and substantially tangent to the cylindrical surface defined by the peripheries of said guide pulleys, a driven shaft provided with a pulley, a bearing supporting said driven shaft in substantially vertical position for movement horizontally over the work, a second arm pivoted on said member about an axis lying substantially in said cylindrical surface and connected with said bearing to maintain a predetermined spacing between said member and bearing, and belt means passing over the pulleys on said member and shafts.

9. In a machine drive, a driving shaft provided with a pulley, an arm pivoted on said driving shaft to swing in a substantially vertical plane, means for counterbalancing said arm, a member provided with guide pulleys and pivoted on said arm about an axis extending longitudinally thereof, a driven shaft provided with a pulley, a bearing supporting said shaft in substantially vertical position for movement horizontally over the work, a second arm pivoted at one end on said member and provided at its other end with a fork embracing said bearing, said arm having means for adjusting the length thereof and operating to maintain a constant spacing between said member and bearing, and belt means passing over said pulleys of said member and shafts.

10. In a machine drive, a driving shaft provided with a pulley, an arm pivoted on said driving shaft to swing in a substantially vertical plane, means for counterbalancing said arm, a member provided with guide pulleys and pivoted on said arm about an axis extending longitudinally of said arm and substantially tangent to the cylindrical surface defined by the peripheries of said guide pulleys, a driven shaft provided with a pulley, a bearing supporting said driven shaft in substantially vertical position for movement horizontally over the work, a second arm pivoted at one end on said member about an axis lying substantially in said cylindrical surface and provided at its other end with a fork loosely embracing said bearing, said arm having means for adjusting the length thereof to maintain a predetermined spacing between said member and bearing, and belt means passing over said pulleys of said member and shafts.

11. In a machine drive, a driving shaft provided with a driving pulley, an arm pivoted on said shaft, a member provided with a guide pulley and pivoted on said arm about an axis substantially tangent to the cylindrical surface formed by the projection of the periphery of said guide pulley, a driven shaft provided with a driven pulley, a bearing for said driven shaft for moving the same laterally parallel with itself over the work, a second arm connected at one end with said driven shaft and at the other end pivoted to said member about an axis substantially lying in said cylindrical surface, and belt means passing over said driving and driven pulleys and said guide pulley.

12. In a machine drive, a driving shaft provided with a driving pulley, a pivoted arm, a member provided with guide pulleys, said member being mounted on said pivoted arm to swing about an axis substantially tangential to the peripheries of said pulleys and said pivoted arm being mounted to swing about an axis spaced from the axis of said driving shaft a distance substantially equal to the radius of said guide pulleys, a driven shaft provided with a driven pulley, a bearing supporting said driven shaft for movement laterally in different directions over the work, a second arm pivoted on said member substantially about the axis of said guide pulleys and connected at its other end with said driven shaft at a distance from said driven pulley substantially equal to the radius of said guide pulleys for maintaining a predetermined spacing between said member and driven shaft, and belt means passing over said driving and driven pulleys and said guide pulleys.

In testimony whereof I hereunto affix my signature.

LORENZ KONRAD BRAREN.